United States Patent
Sytnyk

(10) Patent No.: US 10,268,106 B2
(45) Date of Patent: Apr. 23, 2019

(54) SYSTEM INSTALLATION OF BACKSTAGE

(71) Applicant: Yuliya Sytnyk, Kharkov (UA)

(72) Inventor: Yuliya Sytnyk, Kharkov (UA)

( * ) Notice: Subject to any disclaimer, the term of this patent is extended or adjusted under 35 U.S.C. 154(b) by 4 days.

(21) Appl. No.: 15/687,333

(22) Filed: Aug. 25, 2017

(65) Prior Publication Data

US 2018/0217476 A1    Aug. 2, 2018

(51) Int. Cl.
*G03B 15/10* (2006.01)
*G03B 15/06* (2006.01)

(52) U.S. Cl.
CPC ............. *G03B 15/10* (2013.01); *G03B 15/06* (2013.01)

(58) Field of Classification Search
USPC .............................................. 396/3
See application file for complete search history.

(56) References Cited

U.S. PATENT DOCUMENTS

| | | | | |
|---|---|---|---|---|
| 145,487 A * | 12/1873 | Buchtel | ................. | G03B 15/06 396/3 |
| 216,435 A * | 6/1879 | Moberly | ................. | G03B 15/06 396/3 |
| 281,532 A * | 7/1883 | Lindop | ................. | E06B 9/0638 160/36 |
| 373,794 A * | 11/1887 | Armbruster | ............... | E06B 9/52 160/184 |
| 4,771,305 A * | 9/1988 | Potoroka | ................. | G03B 15/06 296/24.39 |
| 5,235,368 A * | 8/1993 | Oglesbee | ............... | G03B 15/06 396/3 |
| 8,301,022 B1 * | 10/2012 | McGuire | ................. | G03B 15/06 396/2 |
| 2018/0109756 A1 * | 4/2018 | White | ................... | H04N 7/144 |

* cited by examiner

*Primary Examiner* — Clayton E. LaBalle
*Assistant Examiner* — Warren K Fenwick

(57) ABSTRACT

The system of backstage installation contains at least one vertical rack, which supports a tool that forms the backstage. System that forms the backstage, includes at least one movable structure for the installation of backstage connected with stationary vertical rack with the help of at least one rotating element. Movable structure is made with the possibility of rotation in the horizontal plane to transfer from the folded position into unfolded and to be rotated to the specified angle for formation of functional decorated zone. The system contains the backstage facility to form the front decorative backstage surface construction for the installation of the backstage.

15 Claims, 8 Drawing Sheets

SYSTEM INSTALLATION OF BACKSTAGE

FIELD OF THE INVENTION

Utility model belongs to the equipment for photographic studios, such as the structures of systems for backstage installation and is designed mainly for stationary use in the studios while taking pictures.

BACKGROUND OF THE INVENTION

For the work in photographic studios backstages for photographing are used. Usually they are mounted either permanently on the wall of the premises of the photographic studio (in this case, there is a need in a significant number of facilities to ensure a diversity of backstages) or mounted on specially designed collapsible system for the installation of backstage.

The known analogues is a system of installation of backstage [e.g., Falcon Eyes, https://falcon-eyes.ru/catalog/sistemy-ustanovki-fotofonov/sistema-ustanovki-fona-falcon-eyes-v-8510-h] that contains at least one vertical rack, which supports a tool that forms the backstage.

The disadvantage of the analogues of the installation of backstage is that with such a design one cannot provide reliable installation of backstage, backstage replacement requires quite a considerable time, types of backstages that can be used are limited due to the impossibility of installation of backstages that have considerable weight (for example, forming backstages).

SUMMARY OF THE INVENTION

The basis of utility model is the task of creating of the system design of installation of backstage, allowing to provide a significant diversity of backstages used for photographing, speed and convenience of the photographer when changing backstages.

The problem is solved by the fact that the system of backstage installation contains at least one vertical rack, which supports a tool that forms the backstage according to the utility model, a tool that forms the backstage, contains at least one movable structure for setting the backstage connected with stationary vertical rack with at least one rotating element, with the possibility of rotation in the horizontal plane to transfer from the folded position into unfolded and to be rotated to the specified angle for formation of functional decorated zone and backstage facility that forms the front decorative backstage surface of construction for the installation of the backstage.

Due to the fact that utility forms the backstage, contains at least one movable structure for setting the backstage connected with stationary vertical rack with at least one rotating element, with the possibility of rotation in the horizontal plane to transfer from the folded position into unfolded and to be rotated to the specified angle for formation of functional decorated zone and backstage facility that forms the front decorative backstage surface of construction for the installation of the backstage the convenience of using of the backstage installation system, the ability to replace the used backstages quickly when photographing, the possibility of the formation of several functional zones which are used for simultaneous photographing, creating of interesting projections when photographing are provided.

A possible option for the implementation of the system of backstage installation with which the construction for the installation of backstage includes frame and corresponding panel performed as a single or separable facility.

According to one of the options for the implementation of the system of the installation of backstage design for installation of the backstage includes at least two panels connected using at least one rotating element, at that one panel was performed with the possibility of rotation relative to the other in the vertical plane, for the transfer from a folded position into unfolded, and to be rotated to the specified angle and equipped with the facilities for folding and fixing.

This option of the system for installation of backstage can optionally contain a decorative plinth, separating the panels.

According to another option for the implementation of the system of the installation of backstage design for the installation of backstage includes at least one winding shaft, with a winding mechanism, with backstage facility fixed at it and performed in the form of cloth that forms the front decorative background surface.

Mainly design for the installation of backstage includes two winding shafts with canvas fixed on them.

To facilitate the replacement of background it is possible to equip the winding shaft with the drive and transfer, executed with the possibility of securing the winding of cloth.

The system of installation of backstage can also include a set of structures stacked one by one for setting backstage as possible combinations of their options.

The structure for the installation of backstage can be performed with the possibility to replace the backstage facility that forms the front decorative backstage surface, providing an opportunity for an unlimited increase of backstage options that can be used.

Options when front decorative backstage surface forms the colour and/or texture and/or forming backstage that provides a diversity of backstages used for photographing are possible.

The preferred option is the implementation of the utility model in which the system of installation of backstage includes vertical rack performed in the form of a supporting structure on which and bottom parts on the axis a set of hinged structures for the installation of the backstage is installed.

Desirable is an option of implementation of utility model, in which each structure to install the backstage is equipped with handle on the outer side of the front surface, and carrying wheels, and/or rollers installed on the bottom front surface.

To facilitate the replacement of the backstage the system for installation of the backstage can be equipped with the drive and transfer, performed with the ability to provide rotation in the horizontal plane of a structure for the installation of the backstage.

Desirable is an option of implementation of the utility model in which it is equipped with the control unit with the actuating mechanism and/or remote control.

Also the system of installation of backstage can be equipped with at least one illumination device that contains the source of the illumination with a constant and/or variable illumination colour installed fixed, and/or performed with the possibility to change the position, at the top, and/or bottom, and/or lateral parts of the design for the installation of backstage.

The whole set of technical features provides the possibility for convenient usage and usage of the variety of backstages for the photographer for the stationary use in photographic studios.

BRIEF DESCRIPTION OF THE DRAWINGS

Utility model is explained on the drawings where.

DETAIL DESCRIPTIONS OF THE INVENTION

Figure 1:
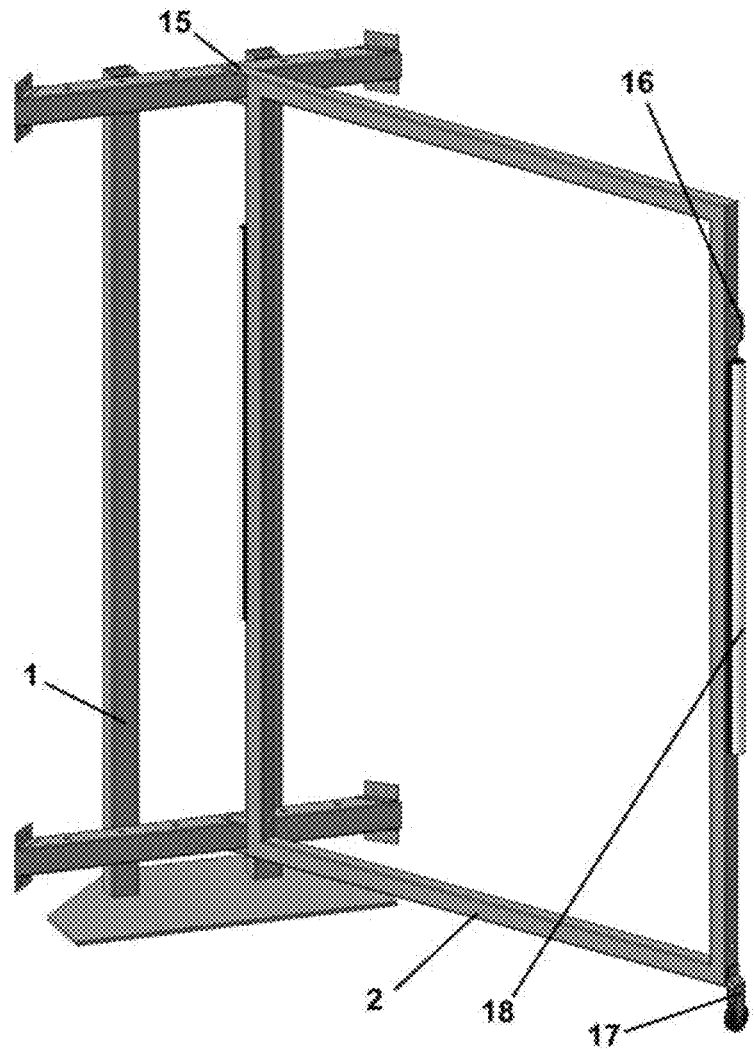
FIG. 1 shows a structure for installation of backstage.
Figure 2:
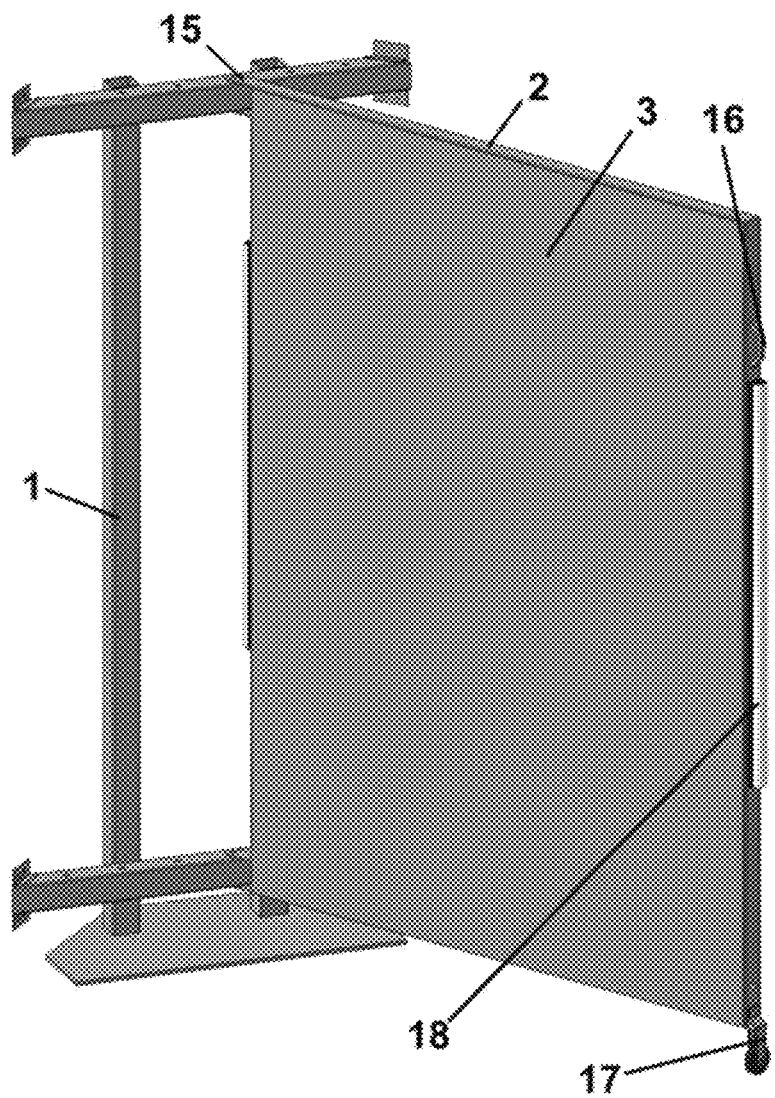
FIG. 2 shows a separate structure for installation of backstage with the backstage facility, FIG. 3—system for installation of backstage, the top view, the view in the folded position, FIG. 4—the first possible option of the implementation of the structure for installation of backstage, FIG. 5—the second possible option of the implementation of the structure for installation of backstage, FIG. 6—the third possible option of the implementation of the structure for installation of backstage, FIG. 7—the system of the installation of backstage for a particular option, axonometric projection, unfolded position, FIG. 8—the system of the installation of backstage for a combination of options, axonometric projection, unfolded position.
Figure 3:
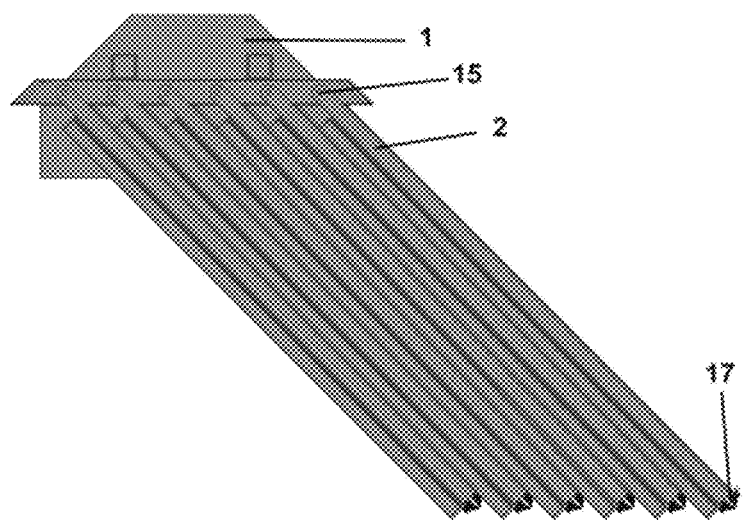

The system of the installation of backstage consists of mounted, for example, on the wall or on the ceiling and the floor of the premises, fixed vertical rack 1 pivotally connected with at least one or preferably set of structures for the installation of backstage 2 (FIG. 3), each of which contains a backstage facility 3, which creates the colour and/or texture, and/or forming backstage. Backstage facility 3 can be both a part of construction for the installation of backstage 2, and changeable.

Figure 4:
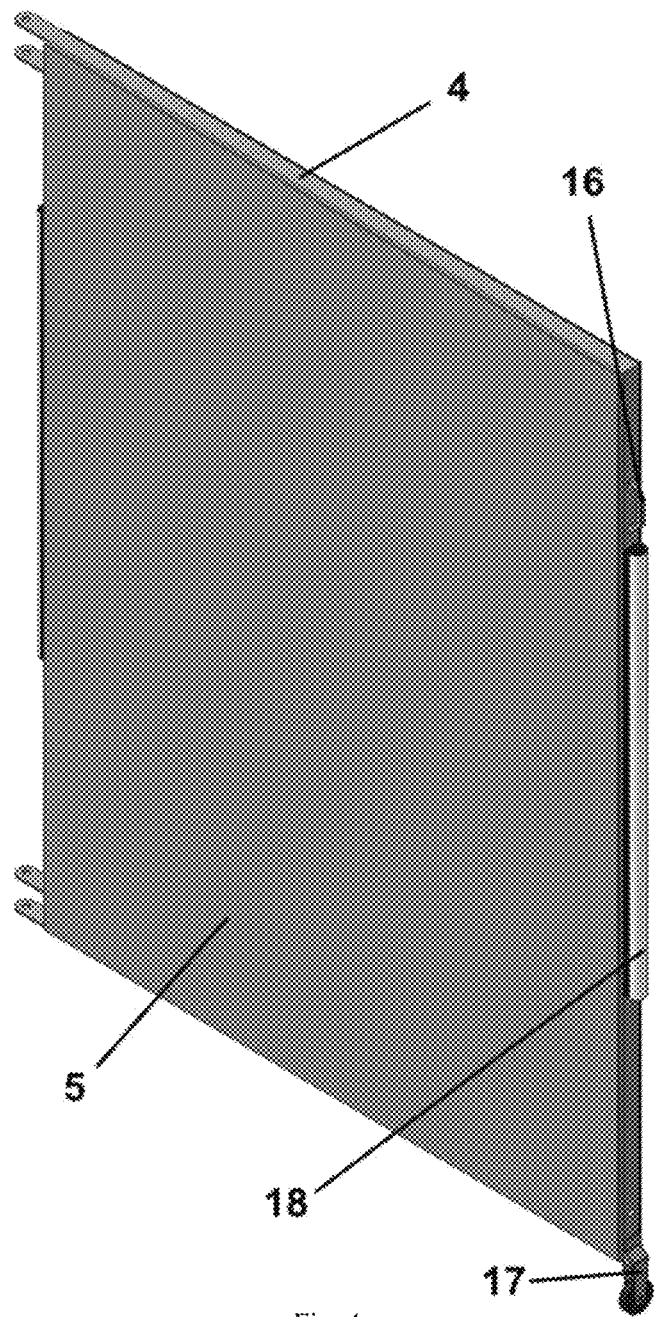

As to the first possible option of implementation (FIG. 4) structure for the installation of background 2 consists of 4 frames and a panel installed in it 5, which forms the front decorative backstage surface.

Figure 5:
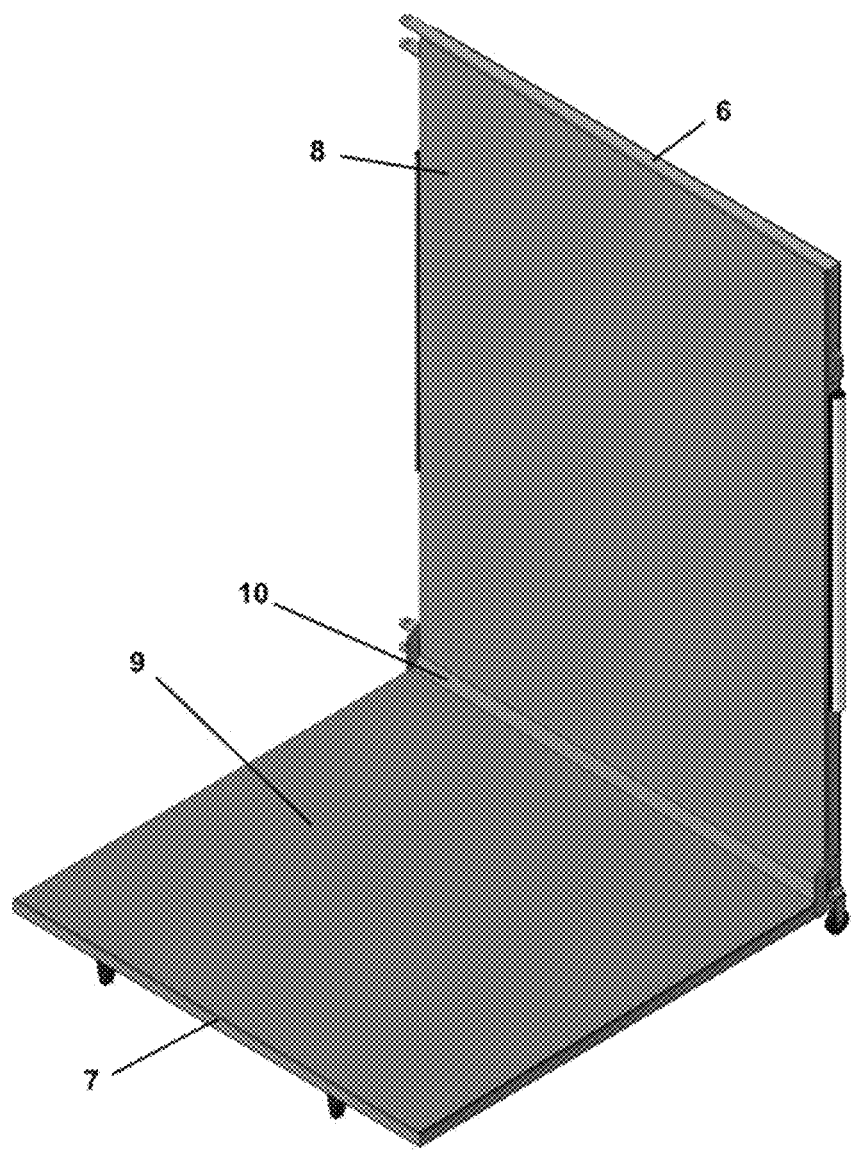

As to the second possible option of implementation (FIG. 5) the structure for the installation of backstage 2 consists of two pivotally connected panels 6 and 7 equipped with fixing device. One of the panels 7 is performed with the ability to rotate in a vertical plane. Each of the panels 6 and 7 contains backstage facilities 8 and 9, and at that backstage facility 8 forms a decorated wall of the premises, backstage facility 9—decorated floor of the surface in unfolded position, and the decorated wall of the premises provided the backstage facility 3 is installed on it. Between the panels 6 and 7 a decorative plinth 10 can be installed that separates them.

Figure 6:
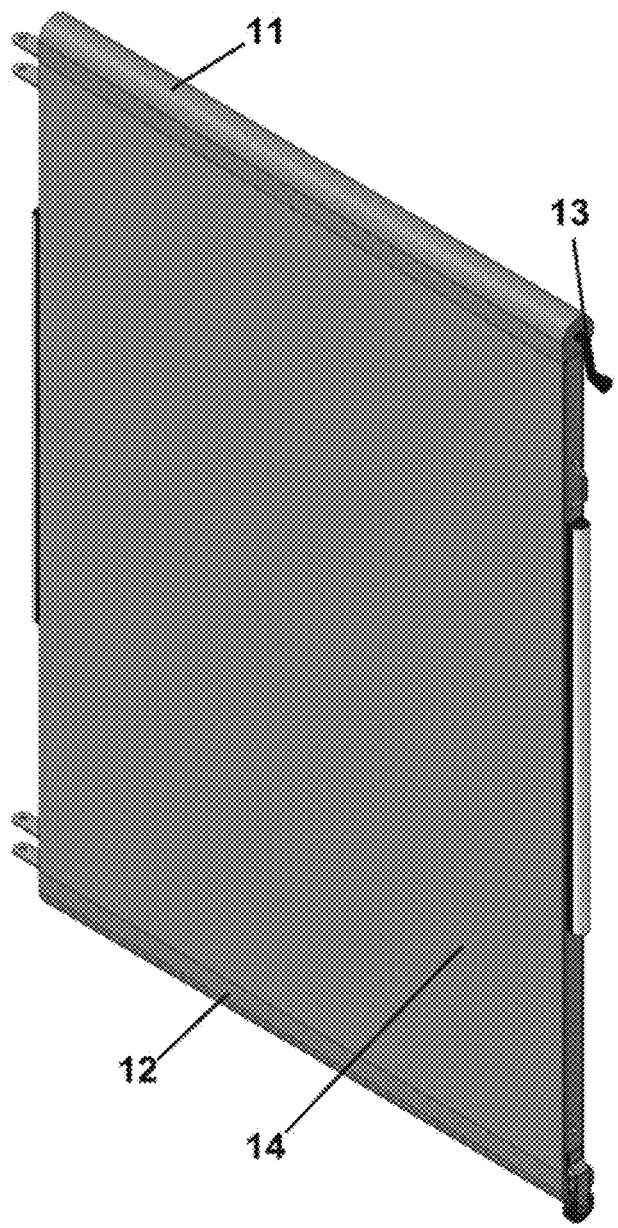

As to the third possible option of implementation (FIG. 6) the structure for the installation of backstage 2 consists of the winding shafts 11 and 12 installed on it, and equipped with winding mechanism 13 and backstage facility fixed on them performed in the form of cloth 14, forming the front decorative backstage surface. Winding shafts, 11 and 12 can be equipped with the drive and transmission to ensure the winding of the cloth 14.

Figure 7:
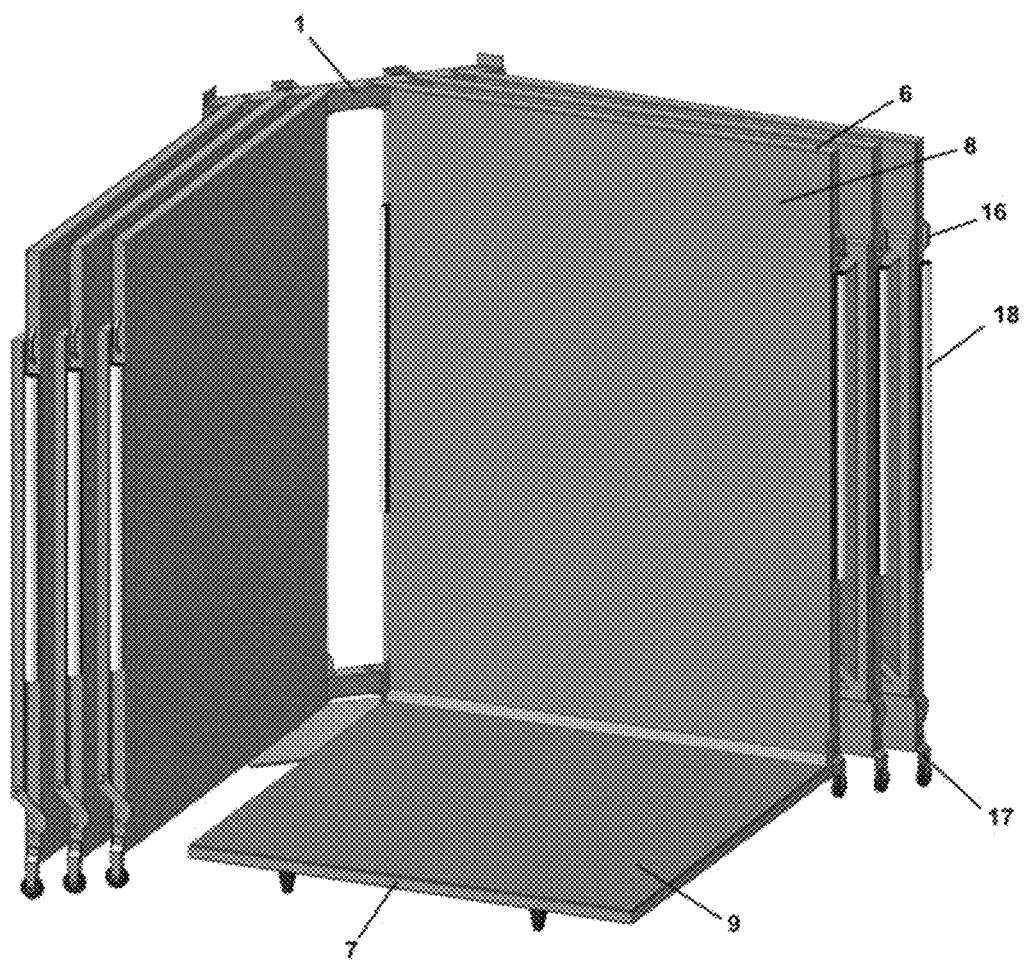
Figure 8:
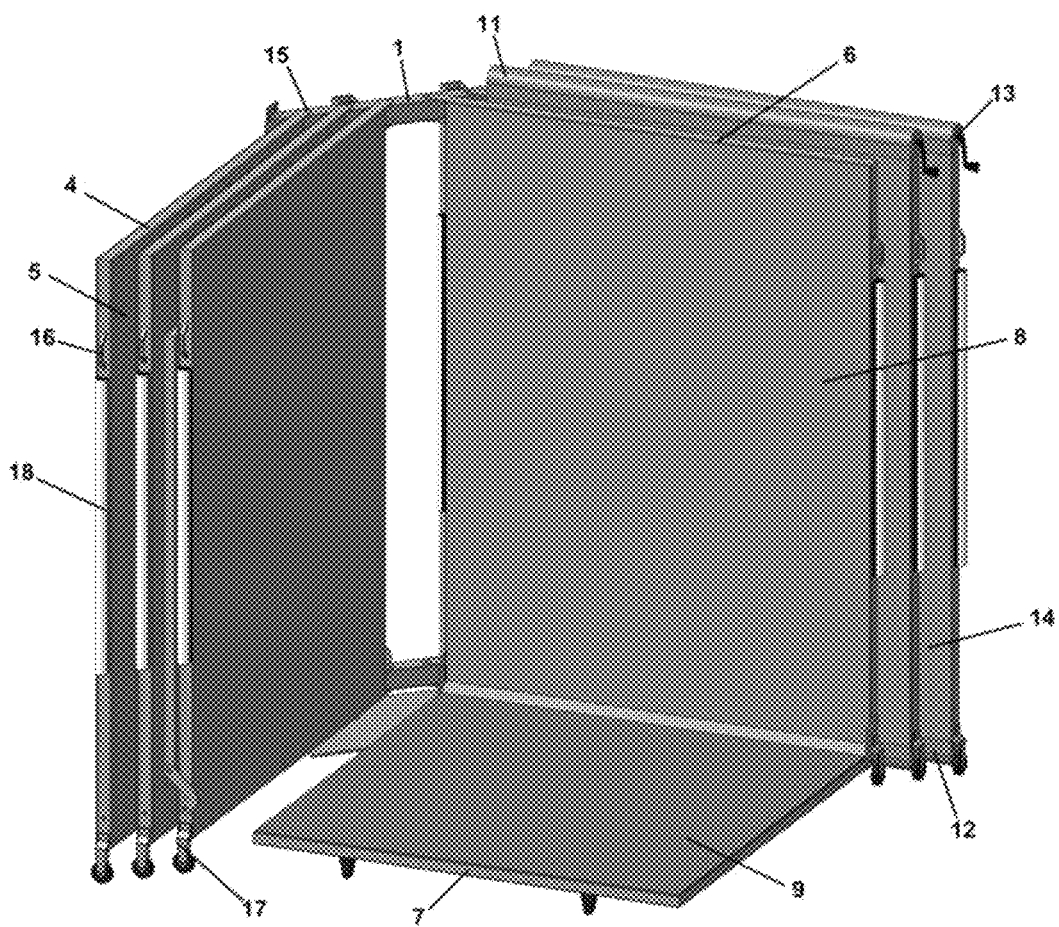

A separate use of each variant of the implementation of structure for the installation of backstage 2 (FIG. 7), as well as combination of options for implementation (FIG. 8) as in one separate and, mainly, in the set of designs for the installation of backstage 2 are possible.

The vertical rack 1 is mostly equipped with the set hinges installed on the axis 15, which bear a structure for installation of backstage 2. Each structure for installation of backstage is equipped with handle 16 on the outer side of the front surface, and carrying wheels and/or rollers 17 installed on the bottom front surface.

The system of installation of backstage can be equipped with the drive and transmission to ensure rotation in the horizontal plane of the structured to install the backstage 2.

To ensure an optimal image capture a system for installation of backstage can also be equipped with illumination device 18 or a set of them that provides the source of the illumination with a constant and/or variable illumination colour installed fixed and/or performed with the possibility to change the position, at the top and/or bottom and/or lateral parts of the design for the installation of backstage 2.

The system of installation of backstage is used as follows.

The set of structures for the installation background 2 is located in the folded position one after another along one of the walls of the room.

For the transfer from the folded position into unfolded the photographer by using the handle 17 installed on the outer side of the front surface or with the use of a drive, installs one or more structures for the installation of backstage 2 rotated to the set angle.

To facilitate the work of the photographer the system of installation of backstage can be additionally equipped with the control unit of the actuating mechanism of the drive, that installs one or more structures for the for the installation of backstage 2, rotated to the specified angle and/or remote control that enhances ease of use of the system of installation of backstage by photographer.

A sector with frontal decorative backstage surfaces is formed between the wall and the construction for the installation of backstage 2 or any two structures for the installation of backstage 2, that forms functional decorated area of the premises for photographing. The rotation of the structure for the installation of the backstage 2 at an angle other than 90 degrees can provide the creation of interesting projections when photographing.

The structure for the installation of backstage 2, as to the second option consists of two hinge jointed panels 6 and 7 containing backstage facilities 8 and 9, that allows, if necessary, at the same time to create with the help of unfolding the same or different horizontal and vertical backstages for photographing due to the fact that the backstage facility 8 forms decorated wall of the room, backstage facility 9 in unfolded position—decorated floor of the room, and in the folded position, optionally, decorated wall of the room.

Panels 5, 6, 7, can be interchangeable, which will ensure significant diversity of used backstages and, if necessary, quick change of backstages for photographing.

Construction for the installation of backstage 2, as to the third option consists of a set of winding shafts 11 and 12 with a backstage facility performed in the form of cloth 14 hooked on them and stretched between them, forming the front decorative backstage surface that also allows due to the winding of the cloth with a varied backstage, to provide, if necessary, a significant diversity of used backstages, and the ability to change quickly the backstage for photography.

System for installation allows to use not only the colour and texture plane backstage (painted, paper, cloth, made of natural and synthetic fabrics, plastic, vinyl, etc.), but also forming backstage that contains three-dimensional decorative pieces that protrude above the surface, including those that have significant weight.

Installation of illumination devices 18 will allow creating both additional effects and favourable conditions for photographing through the use of light and light backstage (for example with the use of led tape or coloured lights).

In general, the technical solution according to the utility model allows ensuring significant diversity of backstages used for photographing, speed and convenience of the work of the photographer while photographing and replacement of backstages, reduction of physical efforts when installing the backstages, improves the efficiency and effectiveness of the work of photographers.

What is claimed is:

1. A system of installation of a backstage that contains at least one vertical rack, which supports a facility forming a backstage, the system that forms the backstage, that contains at least one movable structure for an installation of the backstage connected with stationary vertical rack with at least one rotating element, with a possibility of rotation in a horizontal plane to transfer from a folded position into unfolded and to be rotated to a specified angle for formation of functional decorated zone and backstage facility that forms the front decorative backstage surface of construction for the installation of the backstage.

2. The system according to claim 1, a structure for the installation of backstage includes frame and corresponding panel performed as a single or separable facility.

3. The system according to claim 1, the structure for the installation of backstage includes at least two panels connected using at least one rotating element, at that one panel was performed with a possibility of rotation relative to other in the vertical plane, for a transfer from a folded position into unfolded, and to be rotated to the specified angle and equipped with facilities for folding and fixing.

4. The system according to claim 3 contains a decorative plinth, separating panels.

5. The system according to claim 1, the structure for the installation of backstage contains at least one winding shaft with a winding mechanism and with backstage facility in a form of cloth, fixed on which forms a front decorative backstage surface.

6. The system according to claim 5, the structure for the installation of backstage includes two winding shafts with a cloth stretched between them.

7. The system according to claim 5, the winding shaft is equipped with a drive and transfer, performed with a possibility of ensuring of a cloth winding.

8. The system according to claim 2 contains a set of structures, stacked one by one for setting backstage as possible combinations of their options.

9. The system according to claim 1, the structure for the installation of backstage can be performed with a possibility to replace a backstage facility that forms a front decorative backstage surface.

10. The system according to claim 1, a front decorative backstage surface forms a colour and/or texture, and/or forming backstage.

11. The system according to claim 1 contains a vertical rack, performed in a form of supporting structure, on which top and bottom parts on an axis a set of hinged structures for the installation of the backstage is installed.

12. The system according to claim 1, the structure to install the backstage is equipped with a handle on an outer side of a front surface, and carrying wheels and/or rollers, installed on a bottom front surface.

13. The system according to claim 1, is equipped with a drive and transfer, performed with an ability to provide rotation in a horizontal plane of a structure for the installation of the backstage.

14. The system according to claim 13 is equipped with a control unit with an actuating mechanism and/or remote control.

15. The system according to claim 1, is equipped with at least one illumination device that contains a source of an illumination with a constant and/or variable illumination colour installed fixed and/or performed with a possibility to change a position, at a top and/or bottom and/or lateral parts of a design for the installation of backstage.

* * * * *